(12) United States Patent
Shi et al.

(10) Patent No.: US 8,964,815 B2
(45) Date of Patent: Feb. 24, 2015

(54) METHOD AND APPARATUS FOR RADIO SYNCHRONIZATION DETECTION IN A RAKE RECEIVER

(75) Inventors: Qun Shi, Plainsboro, NJ (US); Jonathan E. Rose, Fort Wayne, IN (US); Ning Hsing Lu, Clifton, NJ (US); Charles A. Simmons, Jr., Fort Wayne, IN (US)

(73) Assignee: Exelis Inc., McLean, VA (US)

(*) Notice: Subject to any disclaimer, the term of this patent is extended or adjusted under 35 U.S.C. 154(b) by 398 days.

(21) Appl. No.: 13/349,955

(22) Filed: Jan. 13, 2012

(65) Prior Publication Data

US 2013/0182748 A1   Jul. 18, 2013

(51) Int. Cl.
*H04B 1/00*   (2006.01)

(52) U.S. Cl.
USPC ............................. 375/150; 375/142

(58) Field of Classification Search
CPC ............... H04B 1/712; H04B 2201/709727; H04B 1/7117; H04B 1/7115; H04B 1/709; H04B 1/7093
USPC .................................. 375/142, 150
See application file for complete search history.

(56) References Cited

U.S. PATENT DOCUMENTS

| | | | | |
|---|---|---|---|---|
| 6,075,809 A * | 6/2000 | Naruse | ............. | 375/147 |
| 6,081,547 A * | 6/2000 | Miya | ............. | 375/130 |
| 6,763,056 B1 * | 7/2004 | Ohsuge | ............. | 375/140 |
| 7,050,484 B2 * | 5/2006 | Hirade | ............. | 375/148 |
| 7,283,578 B2 * | 10/2007 | Lin et al. | ............. | 375/130 |
| 7,480,516 B1 * | 1/2009 | Chen et al. | ............. | 455/522 |
| 2001/0009562 A1 * | 7/2001 | Ohno | ............. | 375/148 |
| 2005/0078639 A1 * | 4/2005 | Oura | ............. | 370/335 |
| 2007/0071072 A1 * | 3/2007 | Banister et al. | ........ | 375/148 |
| 2007/0280370 A1 * | 12/2007 | Liu | ............. | 375/267 |
| 2008/0049816 A1 * | 2/2008 | Nakajima | ........ | 375/148 |
| 2010/0040116 A1 * | 2/2010 | Ostman et al. | ........ | 375/148 |
| 2011/0128994 A1 * | 6/2011 | Beaulieu et al. | ........ | 375/138 |

FOREIGN PATENT DOCUMENTS

| | | |
|---|---|---|
| EP | 1119118 A2 | 7/2001 |
| EP | 1130793 A1 | 9/2001 |
| WO | 9818280 A2 | 4/1998 |

OTHER PUBLICATIONS

Partial European Search Report, EP13150746, Mar. 26, 2013, 6 pages.

(Continued)

*Primary Examiner* — Shuwang Liu
*Assistant Examiner* — Sung Ahn
(74) *Attorney, Agent, or Firm* — Edell, Shapiro & Finnan, LLC

(57) ABSTRACT

Enhanced reception in a communication system is achieved by performing radio synchronization (SYNC) detection after multipath signal components are combined via a Rake combiner. In a communication system comprising a transmitter and a receiver, plural multipath signal components of a signal transmitted by the transmitter are received by the receiver. The plural multipath signal components are correlated with a known spreading code (e.g. a PN code). The correlated multipath signals are analyzed to identify plural correlation peaks and those correlation peaks that exceed a multipath threshold are selected. The selected correlation peaks are combined (i.e., coherently combined) to produce a combined signal. A synchronization event is declared when the combined signal exceeds an adjusted synchronization threshold and the combined signal is then decoded.

19 Claims, 9 Drawing Sheets

(56) References Cited

OTHER PUBLICATIONS

Goto et al., "A Design for a Low-Power Digital Matched Filter Applicable to W-CDMA", Semiconductor Technology Academic Research Center (STARC), 8 pages, retrieved from the Internet on Oct. 26, 2011.

Goto et al., "A Low-Power Digital Matched Filter for Spread-Spectrum Systems", ISLPED '02, Aug. 12-14, 2002, 6 pages.

* cited by examiner

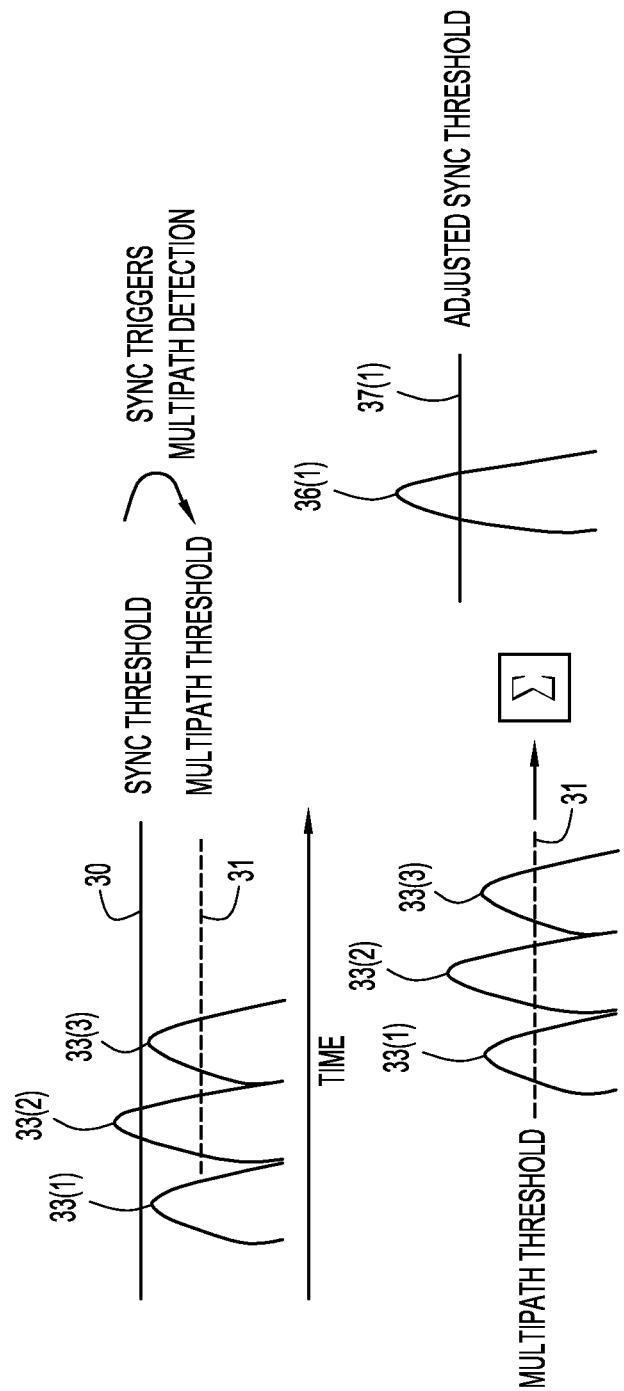

METHOD AND APPARATUS FOR RADIO SYNCHRONIZATION DETECTION IN A RAKE RECEIVER

BACKGROUND

1. Technical Field

Embodiments of the present invention relate to methods and apparatus for enhancing reception of signals more, and particularly, to techniques for using post combiner radio synchronization (SYNC) detection to improve multipath performance of a Rake receiver.

2. Discussion of the Related Art

When telecommunication or radio signals are transmitted from one radio to another, the radio signal may "bounce" of various objects such as buildings or terrain. These bounced signals arrive at the destination receiver at differing times and are referred to as multipath signals. To assist in recovering the multipath signals, some radio applications will use a "Rake" receiver. A Rake receiver is a type of receiver that employs a plurality of sub-receivers or correlators referred to as "fingers" that are each assigned to a different multipath. In this regard, the fingers are like the tines of an ordinary garden rake with each finger collecting signal energy much in the same way that the tines of the garden rake collect leaves. Each finger is designed to detect a single multipath component that can be combined with other multipath components to improve reception.

In a conventional radio Rake receiver, multipath detection (i.e., the Rake finger tap selection) is conditioned upon detecting a radio synchronization or "SYNC" event. That is, conventionally, correlation peaks from a correlation peak detector are first compared with a SYNC threshold value. The SYNC is declared as detected if the correlation peak is greater or equal to the threshold. Once the SYNC is detected, the correlation peaks are then passed on to the Rake finger tap selector along with the time tag information indicating tap locations for multipath detection. The SYNC detection point determines the start time for the Rake finger selection and combiner processing. However, this SYNC triggered multipath detection will be good in a multi path environment only when the first significant path signal is greater than the SYNC threshold and received ahead of the other path signals.

In many situations, especially in a Rayleigh fading environment, it is likely that the first significant path signal may not cross the SYNC threshold. In these cases, conventional detection methods will produce incorrect multipath detection and select incorrect (fewer) Rake fingers for signal combining. In other words, SYNC is declared late in the multi-path window so that most of the possible Rake fingers are omitted. As a result, the Rake receiver's performance will degrade significantly.

SUMMARY

Therefore, in light of the above, and for other reasons that become apparent when example embodiments of the present invention are fully described, a present invention embodiment enhances SYNC detection in a rake receiver, thereby improving multipath performance. SYNC detection is performed after multipath signal components are combined via a Rake combiner.

In a communication system comprising a transmitter and a receiver, plural multipath signal components of a signal transmitted by the transmitter are received by the receiver. The plural multipath signal components are correlated with a known spreading code (e.g. a PN code). The correlated multipath signals are analyzed to identify plural correlation peaks and those correlation peaks that exceed a multipath threshold are selected. The selected correlation peaks are combined (i.e., coherently combined) to produce a combined signal. A synchronization event is declared when the combined signal exceeds an adjusted synchronization threshold and the combined signal is then decoded. Thus, additional multipath signals are incorporated into the combined signal that would otherwise be discarded when conventional SYNC detection is used.

Additional techniques include adjusting the synchronization threshold to compensate for the magnitude of the combined signal, to a level above a noise level in the absence of received signals, or to a level above a cross-correlation threshold that corresponds to a side-lobe signal strength in the presence of received signals. The multipath threshold may be adjusted above a noise level in the absence of received signals.

The correlated multipath signals may be sampled to produce one of a potential on signal peak sample and a potential off signal peak sample during a predetermined time period (e.g., a multipath processing window). An on signal peak sample is detected when the potential on signal peak sample meets or exceeds an on-signal peak threshold and an off signal peak sample is detected when the potential off signal peak sample meets or exceeds an off-signal peak threshold. The off signal peak threshold may be equivalent to the multipath threshold. Signal gain is improved by utilizing signal samples that are obtained when the sample time does not correlate with the received signal peak (i.e., off-signal peak samples).

One of the on signal peak sample or the off signal peak sample is used for further processing (e.g., Rake combining). The potential on signal peak sample is discarded when the potential on-signal peak sample is below the on signal peak threshold, and the potential off-signal peak sample is discarded when the potential off signal peak sample is below the off signal peak threshold.

Multiple signal processing thresholds are employed that are adjusted according to radio frequency (RF) channel conditions. The thresholds are adjusted and used in multiple signal processing stages to combine additional multipath signals before making a SYNC determination.

The aforesaid aspects may be achieved individually and/or in combination, and it is not intended that a present invention embodiment be construed as requiring two or more of the aspects to be combined unless expressly required by the claims attached hereto.

Embodiments of the present invention provide several advantages. In particular, signal gains on the order of 11-13 dB may be achieved when post-combining SYNC detection gains are added to the multipath diversity gain.

The above and still further features and advantages will become apparent upon consideration of the following detailed description of example embodiments of the present invention, particularly when taken in conjunction with the accompanying drawings wherein like reference numerals in the various figures are utilized to designate like components.

BRIEF DESCRIPTION OF THE DRAWINGS

FIG. 3B is a second diagrammatic illustration of the relationship between three received multipath signals and SYNC and multipath thresholds according to an embodiment of the present invention, where a second received multipath signal is the strongest.

DETAILED DESCRIPTION OF EXAMPLE EMBODIMENTS

Embodiments of the present invention involve a SYNC detection technique in which multipath signals that would not trigger a SYNC event in a conventional Rake receiver can be used for coherent combining. As will be described herein, SYNC detection is performed after Rake processing and is used as an input to the Rake combiner, as opposed to conventional Rake receivers that perform SYNC detection prior to Rake processing.

Figure 1:
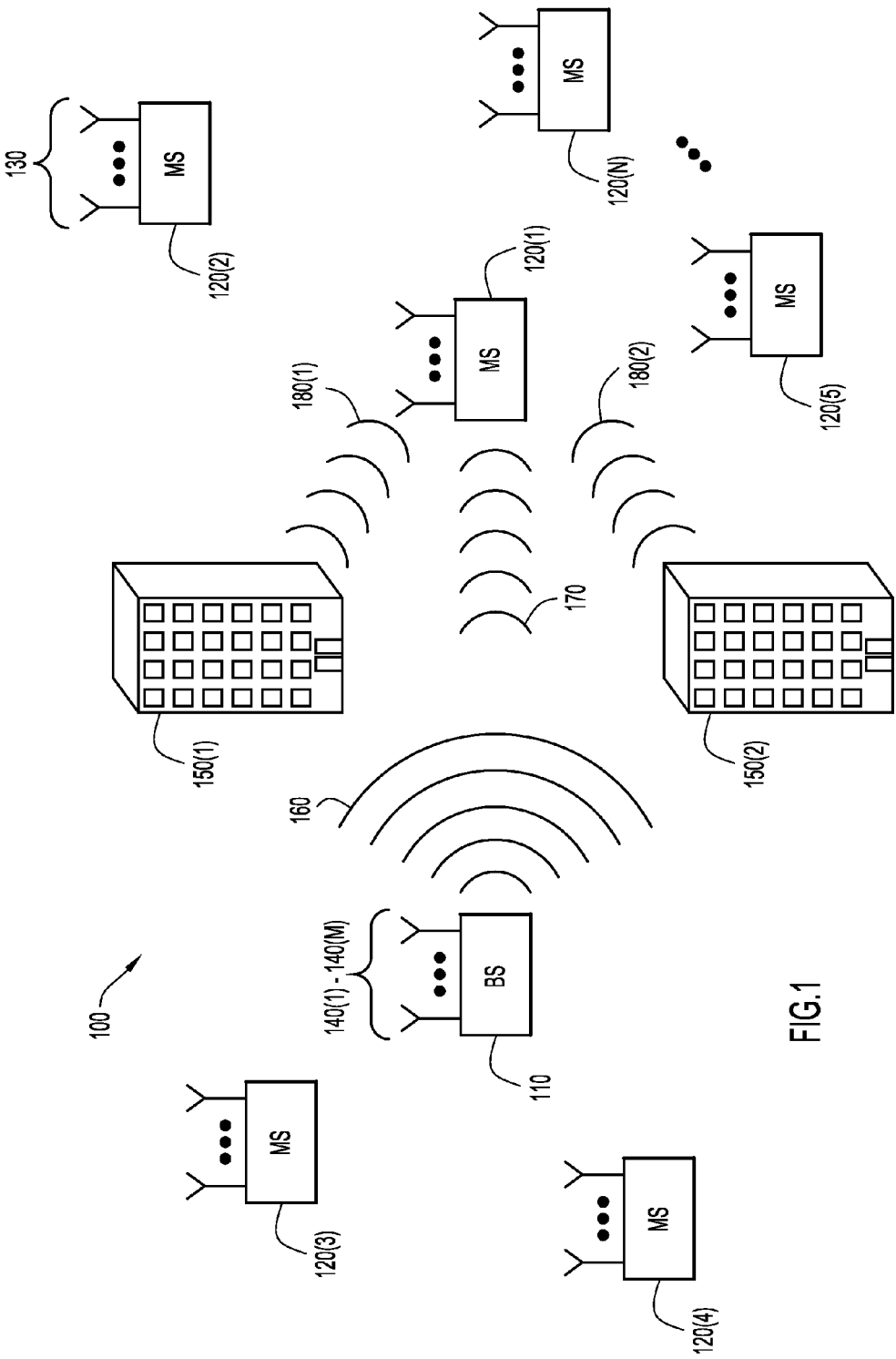
FIG. 1 is a conceptual representation of a receiving communication device communicating with a transmitting communication device by using adaptive SYNC detection according to an embodiment of the present invention.

A representation of the concept underlying a present invention embodiment is illustrated in FIG. 1. FIG. 1 depicts a wireless radio communication system 100. System 100 comprises a first communication device (e.g., a base station (BS) 110) and a plurality of second communication devices (e.g., mobile stations (MSs) 120(1)-120(N)). The BS 110 may connect to other wired data network facilities (not shown) and in that sense serves as a gateway or access point through which the MSs 120(1)-120(N) have access to those data network facilities.

BS 110 comprises a plurality of antennas 140(1)-140(M), and MSs 120(1)-120(N) may also comprise a plurality of antennas 130. The BS 110 may wirelessly communicate with individual ones of the MSs 120(1)-120(N) using a wideband wireless communication protocol in which the bandwidth is much larger than the coherent frequency bandwidth. Examples of such wireless communication protocols are IEEE 802.16 (commercially known as WiMAX®) and the 3$^{rd}$ Generation Partnership Project (3GPP) Long Term Evolution (LTE).

BS 110 transmits a downlink signal 160 to the MS 120(1), where the downlink signal comprises a plurality of subbands. BS 110 may use the plurality of antennas 140(1)-140(M) to aim or beamform downlink signal 160 based on learned radio channel conditions. Along the way the transmission 160 is reflected off various physical objects, e.g., buildings 150(1) and 150(2). The reflected signals, shown as 180(1) and 180(2), will take longer to reach MS 120(1) than the un-reflected or direct signal 170. Signals 180(1), 180(2), and 170, also arrive at MS 120(1) with different directions of arrival (DOAs) as viewed in FIG. 1, and will have differing signal strengths when they arrive at MS 120(1).

It will be appreciated that in some environments a direct signal will not be available and all of the signals received by the MS 120(1) will be reflected signals. Although only two reflected signals are shown it is well-known that many such reflected signals are possible. For simplicity, the examples described herein will be limited to three multipath signals. In this example, signals 180(1), 180(2), and 170 appear as three multipath signals to MS 120(1). Since signals 180(1), 180(2), and 170 were transmitted as downlink signal 160, MS 120(1) combines or adds signals 180(1), 180(2), and 170 in an attempt to reconstruct downlink signal 160, and decode any information in the downlink signal.

Under certain conditions MS 120(1) may have difficulty combining all three signals 180(1), 180(2), and 170. For example, if MS 120(1) is associated with a moving vehicle, channel fading may occur. Fading or a fading channel refers to the distortion that a carrier-modulated radio frequency (RF) signal experiences over certain propagation media. The most common types of fading include slow or large-scale fading, and fast or small-scale multipath fading. Slow fading is a kind of fading caused by larger movements of a mobile station or obstructions within the propagation environment; while fast fading is a kind of fading that occurs with small movements of a mobile station or obstacle. Multipath fading is due to constructive and destructive interference of the transmitted waves.

These fading effects may cause one, two, or possibly all three of signals 180(1), 180(2), and 170 to become uncombinable at the Rake receiver. For example, if the signal strength is too weak or if the signal becomes too distorted, then MS 120(1) may not be able to detect or combine the signals. Furthermore, one or two of the signals may be received with a signal level that is below the conventional SYNC threshold and may be missed or ignored when combining multipath signals. By re-architecting or redesigning the Rake receiver, the techniques provided herein allow MS 120(1) to combine the downlink signals across a broader range of channel conditions than a conventional Rake receiver.

Figure 2:
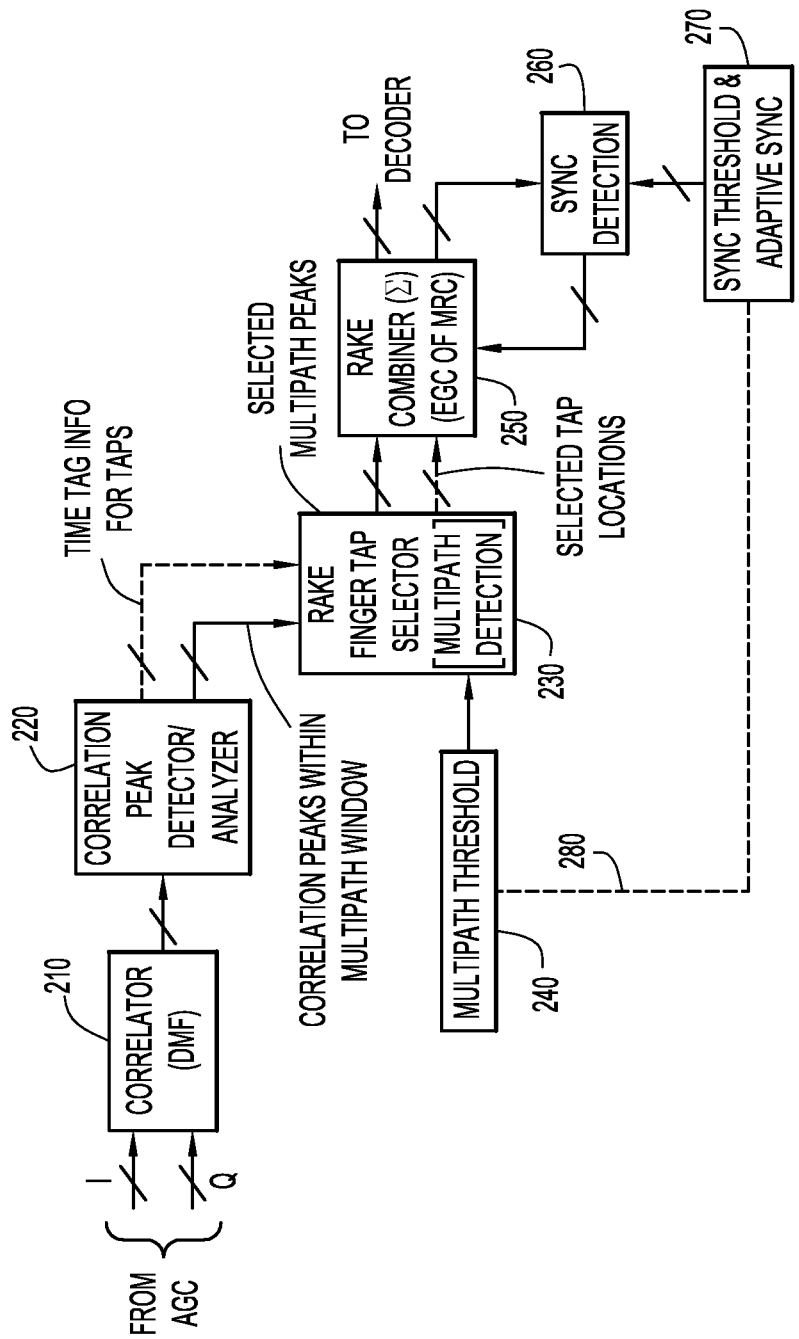
FIG. 2 is a block diagram of an example Rake receiver employing adaptive SYNC detection according to an embodiment of the present invention.

An example implementation of a Rake receiver according to a present invention embodiment is illustrated in FIG. 2. The Rake receiver has a correlator or digital matched filter (DMF) 210, a correlation peak detector/analyzer 220, a Rake finger tap selector 230, a Rake combiner 250, a SYNC detection module 260, and a SYNC threshold and adaptive SYNC module 270. As viewed from the left in FIG. 2, in-phase (I) and quadrature phase (Q) signal components are received from an automatic gain control (AGC) circuit. The I and Q components are fed to correlator 210 where the signals are correlated with a known spreading code (e.g., a pseudo-noise (PN) code) to obtain signals that are directed to this particular receiver.

After signal correlation by the correlator 210, the corresponding data are fed to correlation peak detector/analyzer 220 where signal peaks and their associated time stamps (tags) are determined. The correlation peaks and time tags are forwarded to Rake finger tap selector 230. Rake finger tap selector 230 determines the selected tap locations. To determine which finger taps are selected, the Rake finger tap selector 230 uses a multipath threshold 240 configured to indicate whether a particular tap should be combined to improve signal detection. Once the taps are selected, the associated data are passed to Rake combiner 250 which is configured to combine or sum the various multipath signals. In this example, Rake combiner 250 is configured to employ, e.g., equal gain combining (EGC) or maximal ratio combining (MRC). Other combining techniques may be employed.

The combined signal is forwarded to SYNC detection module 260. SYNC detection module 260 determines whether a synchronization event for the Rake receiver with respect to the combined signal is to be declared or not, and feeds this information back to Rake combiner 250. In order to determine whether SYNC has been achieved, SYNC detection module 260 uses one or more thresholds provided by SYNC threshold and adaptive SYNC module 270. Optionally, as indicated by the dashed line at 280, the multipath threshold 240 may by adjusted by SYNC threshold and adaptive SYNC module 270. Operations of SYNC detection module 260 and SYNC threshold and adaptive SYNC module 270 will be described hereinafter with respect to the remaining figures. Once a SYNC is declared, the combined signal is ready for decoding and the combined signal is passed on for decoding from Rake combiner 250 as viewed in FIG. 2.

In a conventional Rake receiver, SYNC detection takes place prior to Rake finger tap selection (i.e., prior to Rake finger tap selector 230). Thus, in a conventional Rake receiver, signals that are below a SYNC detection threshold and received before a SYNC event is declared, are skipped by both the finger tap selection and Rake combiner steps. The Rake receiver architecture described in FIG. 2 eliminates the shortcomings of the conventional Rake receiver by using all of the correlation outputs of the correlation peak detector and combines them to aid the SYNC detection. Since the Rake receiver takes a snap shot of the correlation outputs of a reference signal against the input signal within the Rake multipath window, it is beneficial to potentially use all the correlation outputs to assist the SYNC detection and consequently optimize the achievable multipath performance. In other words, the Rake receiver described in connection with FIG. 2 replaces the conventional pre-processing SYNC detection approach for multipath signals with a post-processing approach that uses the multipath detection and Rake combining to assist SYNC detection.

Figure 3A:
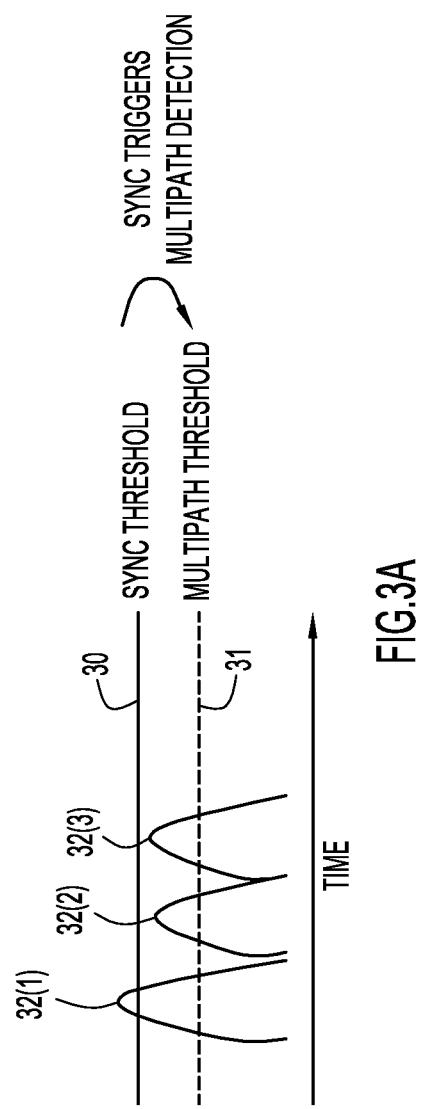
FIG. 3A is a first diagrammatic illustration of the relationship between received multipath signals, and SYNC and multipath thresholds according to an embodiment of the present invention, where a first received multipath signal is the strongest.

To further illustrate the operations of the improved SYNC detection technique provided herein, reference is made to FIGS. 3A through 3D. FIG. 3A shows a first example of three multipath signals 32(1)-32(3) that are received over time and within a multipath processing window. Signals 32(1)-32(3) may be considered to be relative detector output signals (e.g., from correlation peak detector/analyzer 220) where the height of the signal may be considered to be the relative signal strength. Conceptually, signals 32(1)-32(3) may be thought of as received signals corresponding to multipath signals 180(1), 180(2), and 170 from FIG. 1 without any particular reception order.

Signal 32(1) corresponds to a first received signal, signal 32(2) corresponds to a second received signal, and signal 32(3) corresponds to a third received signal, with time passing from left to right as viewed in the figure. FIG. 3A depicts a conventional SYNC threshold 30 and a multipath threshold 31 of a present invention embodiment. The SYNC threshold 30 is conventionally set at a level that, if it were lowered, the packet error rate would increase, or is set to get maximum signal sensitivity for a single path. Multipath threshold 31 is akin to multipath threshold 240 from FIG. 2. In this example, the first received signal 32(1) exceeds the conventional SYNC threshold 30 and triggers a SYNC event or SYNC declaration. Once a SYNC is declared, then finger tap selection and Rake combining takes place with respect to all three signals 32(1)-32(3), since all three signals exceed multipath threshold 31.

A second example of three received multipath signals is illustrated in FIG. 3B. Three multipath signals 33(1)-33(3) are received over time and within a multipath processing window. In this example, the second signal 33(2) exceeds the conventional SYNC threshold 30 and is therefore strong enough to declare a SYNC event. In a conventional Rake receiver, once the SYNC is declared, the finger tap selection and Rake combining takes place only with respect to signals received at or after SYNC detection. This is due to the fact that SYNC detection in a conventional Rake receiver occurs prior (i.e., pre-processing) to the finger tap selection and Rake combining. Accordingly, in a conventional Rake receiver, only signals 33(2) and 33(3) would be included in Rake finger tap selection and Rake combining while signal 33(1) would be skipped or dropped, even though all three signals exceed multipath threshold 31.

However, by virtue of the post-processing nature of the Rake receiver according to present invention embodiments provided herein, signal 33(1) is included for Rake finger tap selection and Rake combining, thereby improving multipath performance of the Rake receiver. In this second example, signal 33(1) exceeds multipath threshold 31 and is therefore considered a candidate for multipath combining along with signals 33(2) and 33(3). Accordingly, all three signals 33(1)-33(3) are included in Rake finger tap selection and Rake combining. As depicted in the lower portion of FIG. 3B, signals 33(1)-33(3) are combined as indicated by the summation symbol, Σ, to produce a combined signal 36. Signal 36(1) has a greater magnitude than any individual signal 33(1), 33(2), or 33(3). Accordingly, an adjusted SYNC threshold 37(1) is employed to compensate for the magnitude of combined signal 36(1). The adjusted SYNC threshold 37(1) may be provided by SYNC threshold and adaptive SYNC module 270. Since, signal 36(1) exceeds adjusted SYNC threshold 37(1), a SYNC event is declared with respect to signals 33(1)-33(3).

Figure 3C:
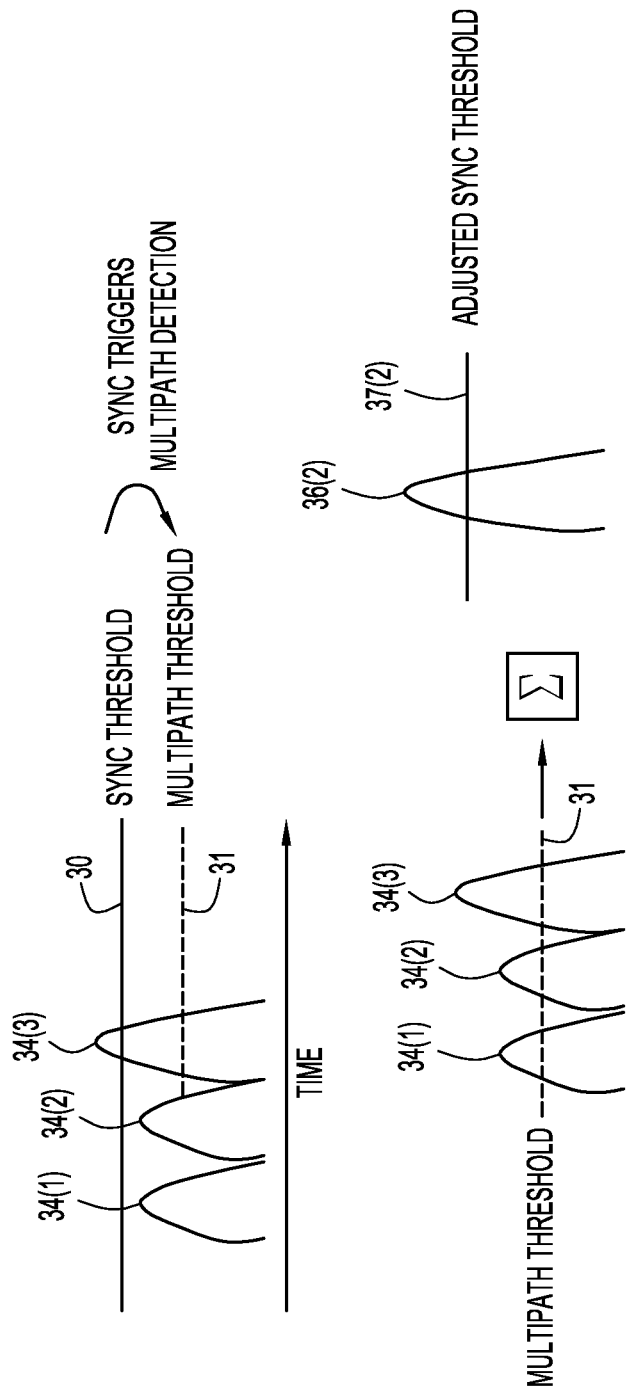
FIG. 3C is a third diagrammatic illustration of the relationship between three received multipath signals and SYNC and multipath thresholds according to an embodiment of the present invention, where a third received multipath signal is the strongest.

A third example of three received multipath signals is illustrated in FIG. 3C. Three multipath signals 34(1)-34(3) are received over time and within a multipath processing window. In this example, the third signal 34(3) exceeds the conventional SYNC threshold 30 and is therefore strong enough to declare a SYNC event. Accordingly, in a conventional Rake receiver, only signal 34(3) would be included for Rake finger tap selection and Rake combining while signals 34(1) and 34(2) would be skipped or dropped.

As described in connection with FIG. 3B, by virtue of the post-processing nature of the Rake receiver according to present invention embodiments provided herein, signals 34(1) and 34(2) are included in Rake finger tap selection and Rake combining, thereby further improving multipath performance of the Rake receiver when compared to a conventional Rake receiver. In this third example, signals 34(1) and 34(2) exceed multipath threshold 31 and are therefore considered candidates for multipath combining along with signal 34(3). Accordingly, all three signals 34(1)-34(3) are included in Rake finger tap selection and Rake combining. As depicted in the lower portion of FIG. 3C, signals 34(1)-34(3) are combined as indicated by the summation symbol, Σ, to produce a combined signal 36(2). Signal 36(2) has a greater magnitude than any individual signal 34(1), 34(2), or 34(3). Accordingly, an adjusted SYNC threshold 37(2) is employed to compensate for the magnitude of combined signal 36(2). The adjusted SYNC threshold 37(2) may be provided by SYNC threshold and adaptive SYNC module 270. Since, signal 36(2) exceeds adjusted SYNC threshold 37(2), a SYNC event is declared with respect to signals 34(1)-34(3).

Figure 3D:
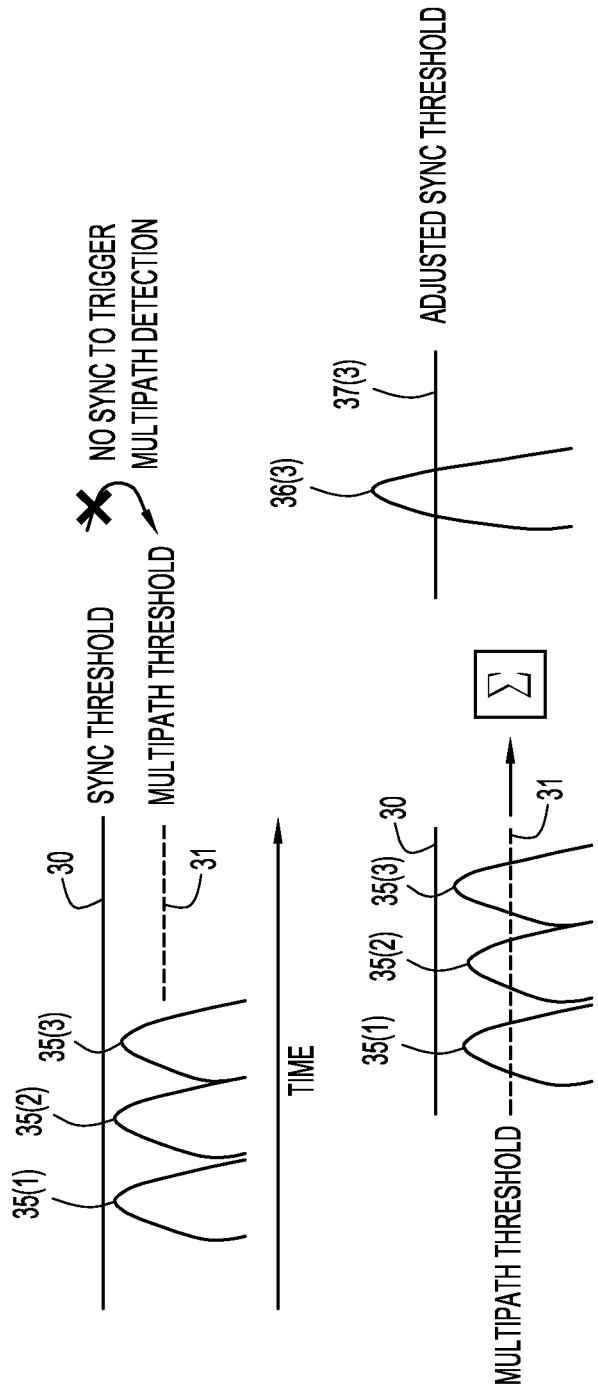
FIG. 3D is a fourth diagrammatic illustration of the relationship between three received multipath signals and SYNC and multipath thresholds according to an embodiment of the present invention, where none of the received multipath signals exceed the SYNC threshold.

A fourth and final example of three received multipath signals is illustrated in FIG. 3D. Three multipath signals 35(1)-35(3) are received over time and within a multipath processing window. In this example, none of signals 35(1)-35(3) exceed the conventional SYNC threshold 30 and a SYNC event would not be declared by a conventional Rake receiver as indicated by the "X" in FIG. 3D. Accordingly, in a conventional Rake receiver, a missed detection event occurs and no further processing is performed with respect to signals 35(1)-35(3), and no information is recovered from those signals.

As described above, signals 35(1)-35(3) exceed multipath threshold 31 and are included in Rake finger tap selection and Rake combining by the improved Rake receiver. In this fourth example, signals 35(1)-35(3) exceed multipath threshold 31 and are therefore considered candidates for multipath combining. As depicted in the lower portion of FIG. 3D, signals 35(1)-35(3) are combined as indicated by the summation symbol, $\Sigma$, to produce a combined signal 36(3). Signal 36(3) has a greater magnitude than any individual signal 35(1), 35(2), or 35(3). Accordingly, an adjusted SYNC threshold 37(3) is employed to compensate for the magnitude of combined signal 36(3). The adjusted SYNC threshold 37(3) may be provided by SYNC threshold and adaptive SYNC module 270. Since, signal 36(3) exceeds adjusted SYNC threshold 37(3), a SYNC event is declared with respect to signals 35(1)-35(3).

To further illustrate the advantages of above described techniques, consider L multipath signals (e.g. three as used in connection with FIG. 3A-3D) and assume equal strength of signals and equal probability of arrival above the multipath or synchronization thresholds. For L multipath signals, L+1 test cases are needed. For example, for L=3, four cases were needed to describe FIGS. 3A-3D; one for each possible multipath signal combination. The conventional detection method can only correctly detect one out of all (L+1) cases when the multipath correlation peaks are compared against the SYNC threshold. That is, conventional detection can only optimally detect the case when the first significant path signal is above the SYNC threshold and is the first to arrive, as shown in FIG. 3A. In all other cases (e.g., as shown in FIGS. 3B-3D) conventional detection is suboptimal and fails all together in some cases (e.g., as shown in FIG. 3D).

Because of the post-processing and enhanced sampling detection techniques, it is evident that present invention embodiments presented herein can correctly detect all (L+1) signal arrival cases with proper scaling and threshold setting, regardless whether the first significant signal arrival is first or last. This is true even when all the potential peaks are below the SYNC threshold before combining (e.g., as shown in FIG. 3D).

Therefore, it is estimated that the improvement of present invention embodiments over the conventional implementation for SYNC detection can be represented as an L/(L+1) ratio or percentage. For example, under these conditions, if the conventional technique yielded a multipath signal gain of X dB using conventional SYNC detection plus RAKE combining over the single path, present invention embodiments would provide an improvement about X * (L/(L+1) dB. Accordingly, the total gain (over the single path) of present invention embodiments would be equal to X+(X * (L/(L+1)) dB.

Another benefit of present invention embodiments is a significant savings in resources and power consumption by processing only one sample per bit or chip for "off signal peak" sample detection as compared to that of traditional correlation plus sync detection techniques that would process both "on signal peak" samples and off signal peak samples (i.e., two samples per chip). It is estimated that this off-peak sample detection would produce an additional improvement, S, of about 1 dB. On and off signal peak samples will be described hereinafter in connection with FIG. 6.

Therefore, for L multipath signals, the total signal gain of present invention embodiments will be X+X * ((L/(L+1))+S dB, where X is the gain obtained if the conventional technique is used and S is the additional gain due to the inclusion of the off sample detection. For example, for the case of three signal paths, the conventional technique yields a signal gain of about 2 dB over the single path, according to existing simulation and lab testing results. When the Rake receiver described herein is used, the signal gain is (3.5+(S=1)) or 4.5 dB. This gain is close to the maximum achievable gain of 4.77 dB for the three multipath signal case. This represents about 2.5 dB improvement over the conventional technique in a static multipath situation.

Another benefit of present invention embodiments is the path diversity gain that can be achieved via Rake processing in the non-static multipath and fading environment (e.g. a Rayleigh fading environment) and can be enhanced through the post-processed SYNC detection. Simulation and lab testing shows that a root-mean-square average of 6-7 dB diversity gain can be achieved through the RAKE processing for the 3-path signal case. Using the post Rake combining processing mechanism, it is estimated that an additional 5-6 dB improvement can be obtained, yielding a total gain of 11-13 dB.

In sum, and with reference to FIG. 2, all the correlation outputs from peak detector 220 are first analyzed (and possibly scaled) and input to Rake finger tap selector 230 for multipath detection along with time tag information. The peak detector 220 also analyzes the correlation outputs to identify the "off signal peak" samples for enhanced SYNC detection. Both "on signal peak" and "off signal peak" samples are included and will be further described in connection with FIG. 6. Peaks within the multipath window are compared against a multipath threshold without declaring SYNC. All correlation peaks that cross the multipath threshold are considered potential multipath signals and finger tap candidates. These selected multipath candidates are then fed into Rake combiner 250 for proper combining (e.g., equal gain or maximum ratio combining).

The output of Rake combiner 250 is then fed into the SYNC detection module 260 for comparing against the SYNC threshold. The SYNC threshold will be adjusted or set to accommodate the effect of Rake combining of the signals. A separate threshold may be used for "off signal peak" sample detection. Once the SYNC is declared, the results are fed back to Rake combiner 250 in order to validate the multipath detection and output the combining result to the decoder. When no SYNC is declared within the multipath window, the multipath detection is deemed false and the combiner output will be dropped. Enhanced multipath and SYNC detection may be carried out throughout the entire symbol sample time interval.

The combined signal has a greater signal-to-noise ratio than the individual received multipath signals, permitting detection at a greater range or with a lower bit error rate without having to increase the transmit power of the transmitter. Consequently, enhanced signal reception and range performance can be achieved in systems that can employ the Rake receiver as described herein.

To avoid false alarms for SYNC detection, the adjusted SYNC threshold is set (or adaptively set) above the noise level in the absence of signals and above the cross-correlation (side lobes) of signals when signals are present.

Figure 4:
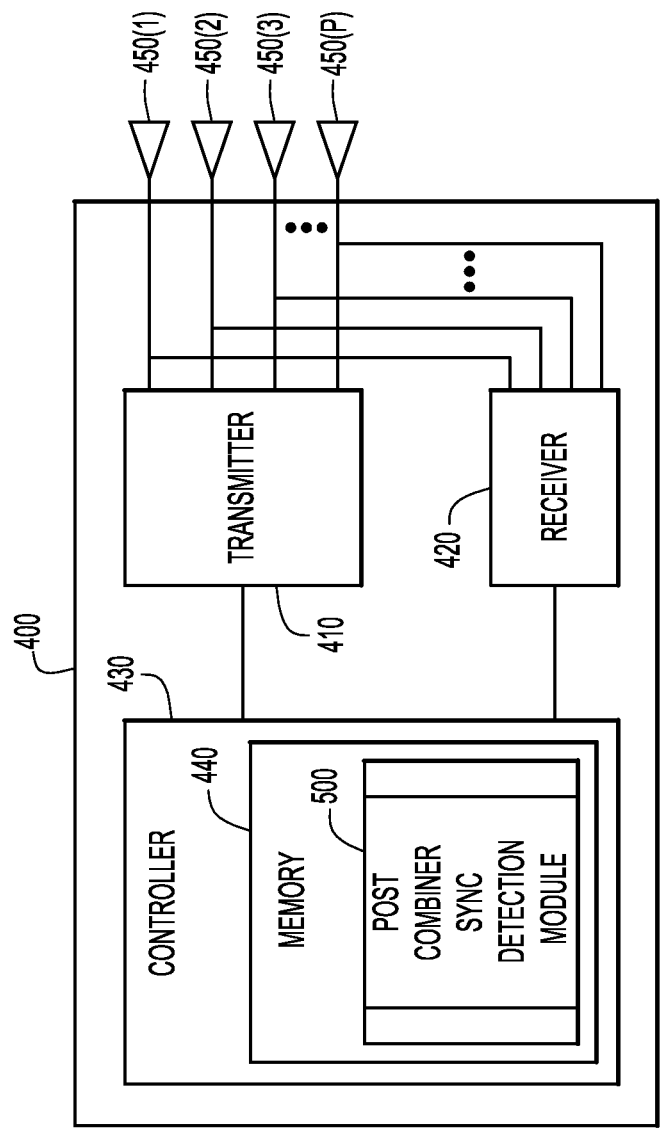
FIG. 4 is a block diagram of an example communication device employed by embodiments of the present invention.

An example communication device 400 employed by present invention embodiments is illustrated in FIG. 4. Specifically, communication device 400 includes a processor or controller 430, a memory 440, and a transmitter 410 and receiver 420 combination coupled to a plurality of antennas 450(1)-450(P). The communication device may further include other components in accordance with a particular application (e.g., speaker, microphone, processing components, display screen, sensors, etc.). The controller is preferably implemented by a conventional microprocessor or controller and controls the communication device to transmit and receive messages in accordance with the adaptive SYNC detection scheme and protocols described below. The transmitter is preferably implemented by a conventional transmitter and transmits messages from the processor, preferably in the form of radio frequency (RF) signals, in accordance with processor instructions. Receiver 420 is implemented using the improved Rake receiver architecture, and is configured to receive signals, preferably in the form of radio frequency (RF) signals, transmitted by the transmitter of another communication device. The receiver may process and forward the received signals to controller 430. Memory 440 is configured with a post combiner sync detection module 500. It should be understood that functions of post combiner sync detection module 500 may be performed in receiver 420 and that receiver 420 and transmitter 410 may share components. Post combiner sync detection module 500 will be described in detail in connection with FIG. 5.

Figure 5:
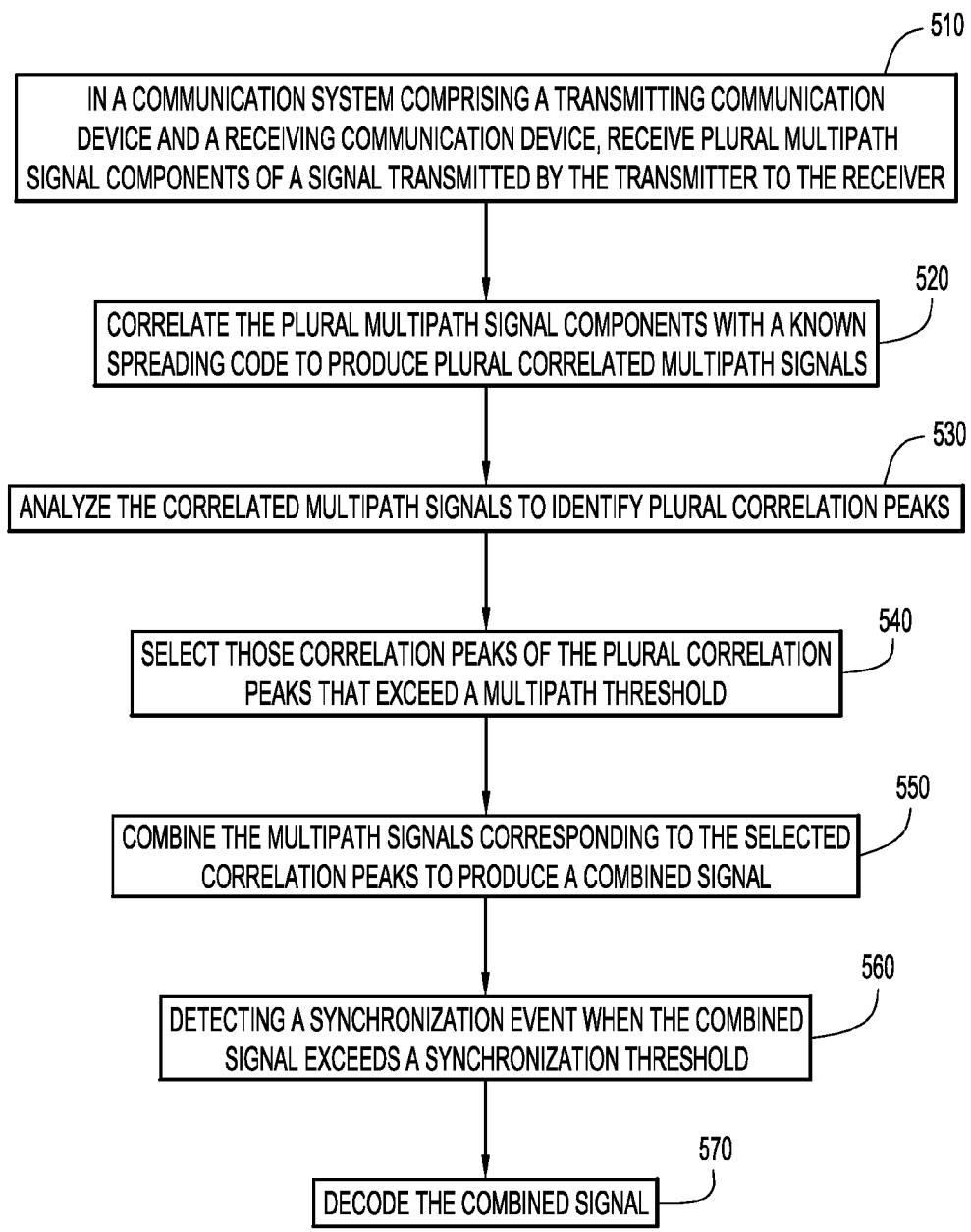
FIG. 5 is a procedural flow chart illustrating a manner in which adaptive SYNC is employed by a communication device according to an embodiment of the present invention.

A procedural flow chart illustrating a manner in which a Rake receiver uses post combiner processing to enhance SYNC detection (e.g., by post combiner sync detection module 500) according to an embodiment of the present invention is shown in FIG. 5. In a communication system comprising a transmitter and a receiver, plural multipath signal components of a signal transmitted by the transmitter are received by the receiver at step 510. The plural multipath signal components are correlated with a known spreading code at step 520. Spreading codes are commonly known as pseudo-noise (PN) codes. The codes are set up such that each receiver knows its own PN code. The PN codes for each message are unique for a transmitter/receiver pair. PN codes for each receiver are orthogonal to each other. Orthogonality ensures the message is properly correlated at the intended receiver. Messages spread with other PN codes simply will not correlate at any receiver other than the one intended.

The correlated multipath signals are analyzed to identify plural correlation peaks at step 530. Those plural correlation peaks that exceed a multipath threshold are selected at step 540. The multipath signals corresponding to the selected correlation peaks are combined (i.e., coherently combined) to produce a combined signal at step 550. A synchronization event is detected when the combined signal exceeds a synchronization threshold at step 560. The combined signal is decoded at step 570. The above described functions may be performed by the various signal processing modules from FIG. 2 (e.g., correlator 210, correlation peak detector/analyzer 220, etc.) and/or controller 430 from FIG. 4.

Additional techniques include adjusting the synchronization threshold by adaptive SYNC module 270 to compensate for the magnitude of the combined signal, to a level above a noise level in the absence of received signals or to a level above a cross-correlation threshold that corresponds to a sidelobe signal strength in the presence of received signals. The multipath threshold may be adjusted by adaptive SYNC module 270 to a level above a noise level in the absence of received signals or as necessary to achieve better system performance under certain radio frequency (RF) channel conditions.

The correlated multipath signals may be sampled to produce one of a potential on signal peak sample and a potential off signal peak sample during a predetermined time period (e.g., the multipath processing window). An on signal peak sample is detected when the potential on signal peak sample meets or exceeds an on signal peak threshold and an off signal peak sample is detected when the potential off signal peak sample meets or exceeds an off signal peak threshold. The off signal peak threshold may be equivalent to the multipath threshold.

One of the on signal peak sample or the off signal peak sample is for further processing (e.g., Rake combining). The potential on signal peak sample is discarded when the potential on signal peak sample is below the on signal peak threshold and the potential off signal peak sample is discarded when the potential off signal peak sample is below the off signal peak threshold.

Figure 6:
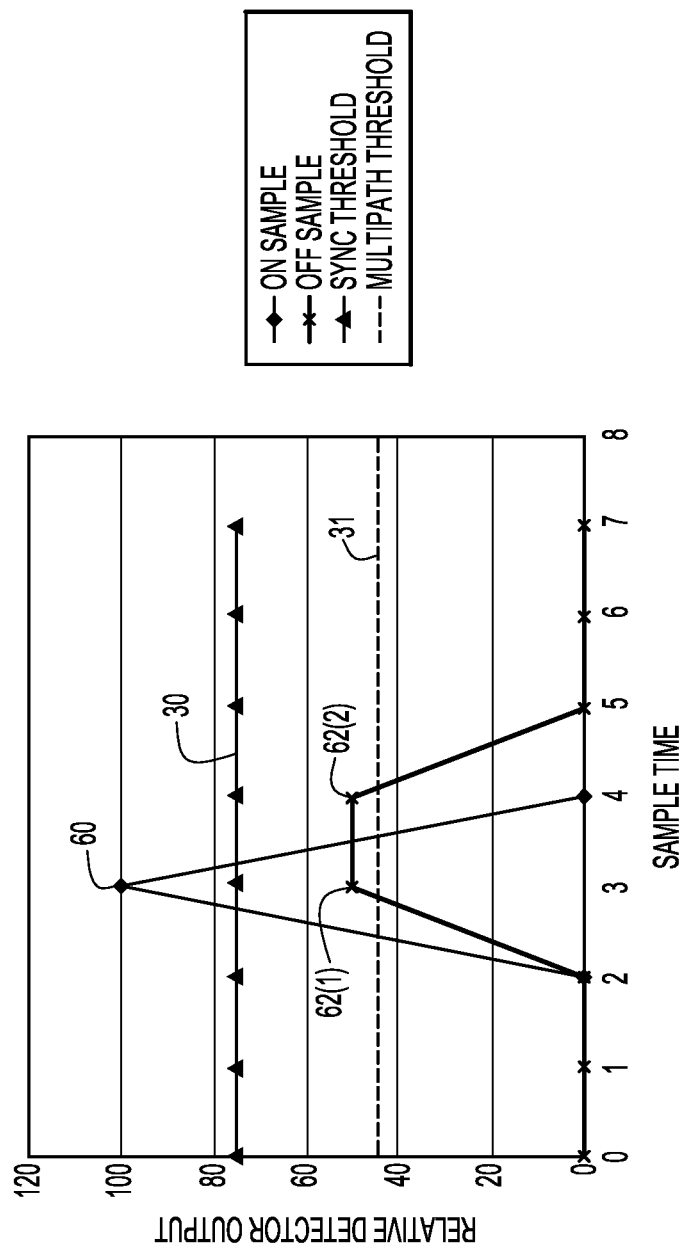
FIG. 6 is a graph illustrating the relationship between a relative detector output level and signal sampling according to an embodiment of the present invention.

A graph illustrating the relationship between a relative detector output level and signal sampling is shown in FIG. 6. In this example, signals are sampled at sample times 1 through 8. At sample time 3, a first signal produces a sample 60 with a relative magnitude of 100 and a second signal produces a sample 62(1) with a relative magnitude of 50. Sample 60 is considered an on signal peak sample since it exceeds SYNC threshold 30, while sample 62(1) is considered an off signal peak sample since it is below SYNC threshold 30 but above multipath threshold 31.

At sample time 4, the second signal produces a second sample 62(2). As can be seen from the figure, sample 60 occurs at the actual signal peak, while it can be surmised (i.e., interpolated) that the signal peak for the second signal occurs somewhere between sample times 3 and 4.

Conventionally one threshold is used for both SYNC and multipath detections. That is, the SYNC threshold and the multipath threshold are the same. In addition, the conventional technique performs the SYNC detection based on the on signal peak samples correlation peaks and/or much stronger off signal peak samples, and compares them to a single threshold. In reality, there are cases where correlation outputs would peak between sampling times, creating the off signal peak samples that are close in strength to (or slightly lower than) on signal peak samples, for which they will likely miss the SYNC threshold.

For example, the conventional detection technique discussed above will likely miss the off signal peak samples with a threshold value set for on signal peak samples detection, i.e., conventional detection would "miss" or discard samples 62(1) and 62(2). This indicates that conventional receiver performance is limited by on signal peak samples, thereby limiting conventional receiver performance. Accordingly, when the off signal peak samples are used in present invention embodiments, the Rake receiver performance is improved.

A process for using off signal peak samples according to an embodiment of the present invention includes, first identifying a peak (e.g., a DMF output sample surrounded by lower values adjacent to the sample). If two adjacent samples (to the DMF output sample being considered) are equal (such as samples 62(1) and 62(2)), the peak is declared to be the earlier sample. Second, determine if the sample under consideration is on peak or off peak. By way of example, if the sample magnitude is greater than half the magnitude of an adjacent sample, then the sample is off peak.

Next, compare the sample to the threshold. If the sample is on peak, compare it to a "normal" or SYNC threshold. If the sample is off peak, compare it to a threshold lower than the normal one. The threshold is lower because it is off peak and consequently cannot be as high as the actual peak. The lower threshold may be based on the correlator function and the signal processing that occurs upstream of the DMF. Alternatively, the off peak sample may be scaled by a multiplier and then compared to the normal threshold. This alternative method estimates the true peak value. The multiplier is based on the DMF function and the upstream signal processing.

Next, the peaks are summed for a total energy value (i.e., the samples that exceed the appropriate threshold). For on peak samples, the energy value will be close to the peak's true value, and for off peak samples, the energy value will be lower than the true peak value. Alternatively, a multiplier may be used to estimate the true peak value from an off peak samples. Lastly, the total energy is compared to the SYNC threshold to declare a SYNC event.

It will be appreciated that the embodiments described above and illustrated in the drawings represent only a few of the many ways of implementing a method and apparatus for improved radio synchronization (SYNC) detection and multipath performance in a Rake receiver.

The communication networks may be of any type (e.g., wireless, wired, mobile, stationary, Ad-Hoc, any combinations thereof, etc.), and include any quantity of transceivers (transmitters or receivers) arranged in any fashion and disposed at any suitable locations. The transceiver devices may communicate via any suitable communications medium (e.g., wireless communications, etc.).

The communication devices may include any quantity of conventional or other transmitters, receivers and/or transceivers, where each transmitter or transceiver may transmit signals at any suitable frequency and in any suitable energy form (e.g., radio signals, microwave, optical signals, etc.), and any quantity of conventional or other receivers or transceivers, where each receiver or transceiver may receive signals at any suitable frequency and in any suitable energy form (e.g., radio signals, microwave, optical signals, etc.). The receivers include Rake receivers to combine and resolve the transmitted signals. The communication devices may include any quantity of independent transmitting and/or receiving devices, and may utilize any quantity of frequency channels of any desired frequencies and may send any type of data. The communication devices may further include any quantity of any types of devices (e.g., processors, image capture, sensors, speakers, microphone, keypad, etc.) for a particular application. The communication devices may further include any quantity of any types of input or control devices (e.g., buttons, switches, etc.) to enter voice or data and control device operation, where the devices may be in the form of any type of radio unit or other communications device.

The processor of the communication devices may be implemented by any conventional or other microprocessor, controller or circuitry to perform the functions described herein, while any quantity of processors or processing devices or circuitry may be employed within the communication devices, where the processor functions may be distributed in any fashion among any quantity of hardware and/or software modules or units, processors or other processing devices or circuits (e.g., an application specific integrated circuit (ASIC), Field Programmable Gate Array (FPGA), or a digital signal processor (DSP)). The software for the processor of the communication devices may be implemented in any suitable computer language, and could be developed by one of ordinary skill in the computer and/or programming arts based on the functional description contained herein and the flow charts and diagrams illustrated in the drawings. Further, any references herein of software performing various functions generally refer to processors performing those functions under software control. The software and/or algorithms described above and illustrated in the flow charts and diagrams may be modified in any manner that accomplishes the functions described herein. The communication devices may alternatively include any components arranged in any fashion to facilitate information transfer in the manner described above.

The software of the present invention embodiments may be available on a program product apparatus or device including a recordable or computer usable medium (e.g., magnetic or optical mediums, magneto-optic mediums, floppy diskettes, CD-ROM, DVD, memory devices, etc.), and/or may be downloaded (e.g., in the form of carrier waves, packets, etc.) to systems via a network or other communications medium.

The memory may be included within or external of the processor, and may be implemented by any conventional or other memory unit with any suitable storage capacity and any type of memory (e.g., random access memory (RAM), read only memory (ROM), etc.). The memory may store any desired information for performing the radio synchronization (SYNC) detection and multipath performance for Rake receiver techniques of present invention embodiments (e.g., Rake receiver modules, data, etc.). The communications devices may include an interface unit for networked communications that may be configured for communication over any desired network (e.g., wireless, cellular, LAN, WAN, Internet, Intranet, VPN, etc.).

The receiver system may be implemented by any conventional or other components. These components may be implemented by any quantity of any combination of hardware and/or software units or modules. The detector may detect any quantity of peaks, and utilize any suitable threshold for detecting the peaks. The threshold utilized by the threshold detector may be of any suitable value or within any suitable range.

The antennas may be implemented by any conventional or other antenna (e.g., omni-directional, directional, smart, etc.) configurable to transmit and receive the signals to and from the one or more other communications devices.

It should be understood that present invention embodiments are not limited to any particular protocol, messaging scheme, or type of channel access, and are useful in any context or network that would benefit resulting from the Rake combining of present invention embodiments. Further, the communication devices of present invention embodiments may be stationary or mobile devices.

From the foregoing description, it will be appreciated that the invention makes available a novel method and apparatus for improving radio synchronization (SYNC) detection and multipath performance in a Rake receiver, where additional multipath signal components are coherently combined when the components would otherwise be discarded by a conventional Rake receiver.

Having described preferred embodiments of a new and improved method and apparatus for improving radio synchronization (SYNC) detection and multipath performance in a Rake receiver, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. In a communication system comprising a transmitting communication device and a receiving communication device, a method of enhancing reception at the receiving communication device, comprising:
   (a) receiving plural multipath signal components of a signal transmitted by the transmitting communication device;
   (b) correlating the plural multipath signal components with a known spreading code to produce plural correlated multipath signals;
   (c) analyzing the correlated multipath signals to identify plural correlation peaks;
   (d) selecting those correlation peaks of the plural correlation peaks that exceed a multipath threshold, wherein the muitpath threshold is set to a level that is lower than a synchronization threshold used for detecting a synchronization event;
   (e) combining the multipath signals corresponding to the selected correlation peaks to produce a combined signal;
   (f) adjusting the synchronization threshold to compensate for a magnitude of the combined signal; and
   (g) detecting the synchronization event when the combined signal exceeds the adjusted synchronization threshold.

2. The method of claim 1, wherein step (f) includes adjusting the synchronization threshold above a noise level in the absence of received signals.

3. The method of claim 1, wherein step (f) includes adjusting the synchronization threshold above a cross-correlation threshold that corresponds to a side-lobe signal strength in the presence of received signals.

4. The method of claim 1, further comprising:
   (h) adjusting the multipath threshold above a noise level in the absence of received signals.

5. The method of claim 1, wherein step (c) includes sampling the correlated multipath signals to produce one of a potential on signal peak sample and a potential off signal peak sample during a predetermined time period.

6. In a communication system comprising a transmitting communication device and a receiving communication device, a method of enhancing reception at the receiving communication device, comprising:
   (a) receiving plural multipath signal components of a signal transmitted by the transmitting communication device;
   (b) correlating the plural multipath signal components with a known spreading code to produce plural correlated multipath signals;
   (c) analyzing the correlated multipath signals to identify plural correlation peaks, wherein analyzing includes:
      (c.1) sampling the correlated multipath signals to produce one of a potential on signal peak sample and a potential off signal peak sample during a predetermined time period;
      (c.2) detecting an on signal peak sample when the potential on signal peak sample meets or exceeds an on signal peak threshold; and
      (c.3) detecting an off signal peak sample when the potential off signal peak sample meets or exceeds an off signal peak threshold;
   (d) selecting those correlation peaks of the plural correlation peaks that exceed a multipath threshold;
   (e) combining the multipath signals corresponding to the selected correlation peaks to produce a combined signal; and
   (f) detecting a synchronization event when the combined signal exceeds the synchronization threshold.

7. The method of claim 6, wherein the of signal peak threshold is equivalent to the multipath threshold.

8. The method of claim 6, wherein step (c) further includes:
   (c.4) forwarding one of the on signal peak sample and the off signal peak sample for further processing.

9. The method of claim 6, wherein step (c) further includes:
   (c.4) discarding the potential on signal peak sample when the potential on signal peak sample is below the on signal peak threshold; and
   (c.5) discarding the potential of signal peak sample when the potential off signal peak sample is below the off signal peak threshold.

10. The method of claim 1, further comprising;
    (h) decoding the combined signal.

11. An apparatus comprising:
    at least one antenna;
    a receiver for receiving a signal transmitted by a transmitter, the receiver comprising one or more signal processing modules configured to:
      receive plural multipath signal components of a signal transmitted by the transmitter to the receiver;
      correlate the plural multipath signal components with a known spreading code to produce plural correlated multipath signals;
      analyze the correlated multipath signals to identify plural correlation peaks;
      select those correlation peaks of the plural correlation peaks that exceed a multipath threshold, wherein the multipath threshold is set to a level that is lower than a synchronization threshold used to detect a synchronization event;
      combine the multipath signals corresponding to the selected correlation peaks to produce a combined signal;
      adjust the synchronization threshold to compensate for a magnitude of the combined signal; and
      detect the synchronization event when the combined signal exceeds the adjusted synchronization threshold.

12. The apparatus of claim 11, wherein the one or more signal processing modules are configured to adjust the synchronization threshold above a noise level in the absence of received signal.

13. The apparatus of claim 11, wherein the one or more signal processing modules are configured to adjust the synchronization threshold above a cross-correlation threshold that corresponds to a side-lobe signal strength in the presence of received signals.

14. The apparatus of claim 11, wherein the one or more signal processing modules are further configured to adjust the multipath threshold above a noise level in the absence of received signals.

15. The apparatus of claim 11, wherein the one or more signal processing modules are configured to sample the correlated multipath signals to produce one of a potential on signal peak sample and a potential off signal peak sample during a predetermined time period.

16. An apparatus comprising:
    at least one antenna;
    a receiver for receiving a signal transmitted by a transmitter, the receiver comprising one or more signal processing modules configured to:

receive plural multipath signal components of a signal transmitted by the transmitter to the receiver;

correlate the plural multipath signal components with a known spreading code to produce plural correlated multipath signals;

analyze the correlated multipath signals to identify plural correlation peaks;

sample the correlated multipath signals to produce one of a potential on signal peak sample and a potential off signal peak sample during a predetermined time period;

detect an on signal peak sample when the potential on signal peak sample meets or exceeds an on signal peak threshold;

detect an off signal peak sample when the potential off signal peak sample meets or exceeds an off signal peak threshold;

select those correlation peaks of the plural correlation peaks that exceed a multipath threshold;

combine the multipath signals corresponding to the selected correlation peaks to produce a combined signal; and detect a synchronization event when the combined signal exceeds a synchronization threshold.

17. The apparatus of claim 16, wherein the one or more signal processing modules are configured to forward one of the on signal peak sample and the off signal peak sample for further processing.

18. The apparatus of claim 16, wherein the one or more signal processing modules are configured to:

discard the potential on signal peak sample when the potential on signal peak sample is below the on signal peak threshold; and discard the potential off signal peak sample when the potential off signal peak sample is below the off signal peak threshold.

19. The apparatus of claim 11, wherein the one or more signal processing modules are further configured to decode the combined signal.

* * * * *